(12) United States Patent
Brewerton et al.

(10) Patent No.: US 9,836,318 B2
(45) Date of Patent: Dec. 5, 2017

(54) SAFETY HYPERVISOR FUNCTION

(71) Applicant: Infineon Technologies AG, Neubiberg (DE)

(72) Inventors: Simon Brewerton, Trowbridge (GB); Glenn Farrall, Bristol (GB); Neil Hastie, Lydney (GB); Frank Hellwig, Munich (DE); Richard Knight, Stroud (GB); Antonio Vilela, Mering (DE)

(73) Assignee: Infineon Technologies AG, Neubiberg (DE)

( * ) Notice: Subject to any disclaimer, the term of this patent is extended or adjusted under 35 U.S.C. 154(b) by 716 days.

(21) Appl. No.: 14/206,033

(22) Filed: Mar. 12, 2014

(65) Prior Publication Data
US 2015/0242233 A1    Aug. 27, 2015

Related U.S. Application Data

(60) Provisional application No. 61/942,801, filed on Feb. 21, 2014.

(51) Int. Cl.
| G06F 12/00 | (2006.01) |
| G06F 9/455 | (2006.01) |
| G06F 9/30 | (2006.01) |
| G06F 13/28 | (2006.01) |
| G06F 21/71 | (2013.01) |
| G06F 21/85 | (2013.01) |
| G06F 11/00 | (2006.01) |

(52) U.S. Cl.
CPC ...... *G06F 9/45558* (2013.01); *G06F 9/30043* (2013.01); *G06F 13/28* (2013.01); *G06F 21/71* (2013.01); *G06F 21/85* (2013.01); *G06F 2009/45583* (2013.01); *G06F 2009/45587* (2013.01)

(58) Field of Classification Search
CPC .................................. G06F 12/00; G06F 11/00
USPC ......................... 726/2, 27; 713/189; 710/308
See application file for complete search history.

(56) References Cited

U.S. PATENT DOCUMENTS

| 3,858,182 | A | * | 12/1974 | Delagi | ..... G06F 9/462 726/16 |
| 4,589,066 | A | * | 5/1986 | Lam | ..... G06F 11/187 439/857 |
| 5,237,609 | A | * | 8/1993 | Kimura | ..... G06Q 20/341 235/380 |
| 2003/0233565 | A1 | * | 12/2003 | Kim | ..... G06F 12/1433 713/193 |

(Continued)

FOREIGN PATENT DOCUMENTS

CN    1447228 A    10/2003

*Primary Examiner* — Christopher Shin
(74) *Attorney, Agent, or Firm* — Eschweiler & Potashnik, LLC

(57) ABSTRACT

The disclosure relates to systems and methods for defining a processor safety privilege level for controlling a distributed memory access protection system. More specifically, a safety hypervisor function for accessing a bus in a computer processing system includes a module, such as a Computer Processing Unit (CPU) or a Direct Memory Access (DMY) for accessing a system memory and a memory unit for storing a safety code, such as a Processor Status Word (PSW) or a configuration register (DMA (REG)). The module allocates the safety code to a processing transaction and the safety code is visible upon access of the bus by the module.

14 Claims, 4 Drawing Sheets

(56) References Cited

U.S. PATENT DOCUMENTS

| | | | |
|---|---|---|---|
| 2005/0028159 A1 | 2/2005 | Kodama et al. | |
| 2007/0006025 A1* | 1/2007 | Onozuka | H04L 1/0046 714/11 |
| 2008/0141266 A1* | 6/2008 | Hunt | G06F 21/562 718/106 |
| 2010/0011345 A1* | 1/2010 | Hickerson | G06F 11/3632 717/130 |
| 2010/0186080 A1* | 7/2010 | Thanner | G06F 21/606 726/16 |
| 2010/0281273 A1* | 11/2010 | Lee | G06F 21/72 713/190 |
| 2011/0296212 A1* | 12/2011 | Elnozahy | G06F 1/3203 713/320 |

* cited by examiner

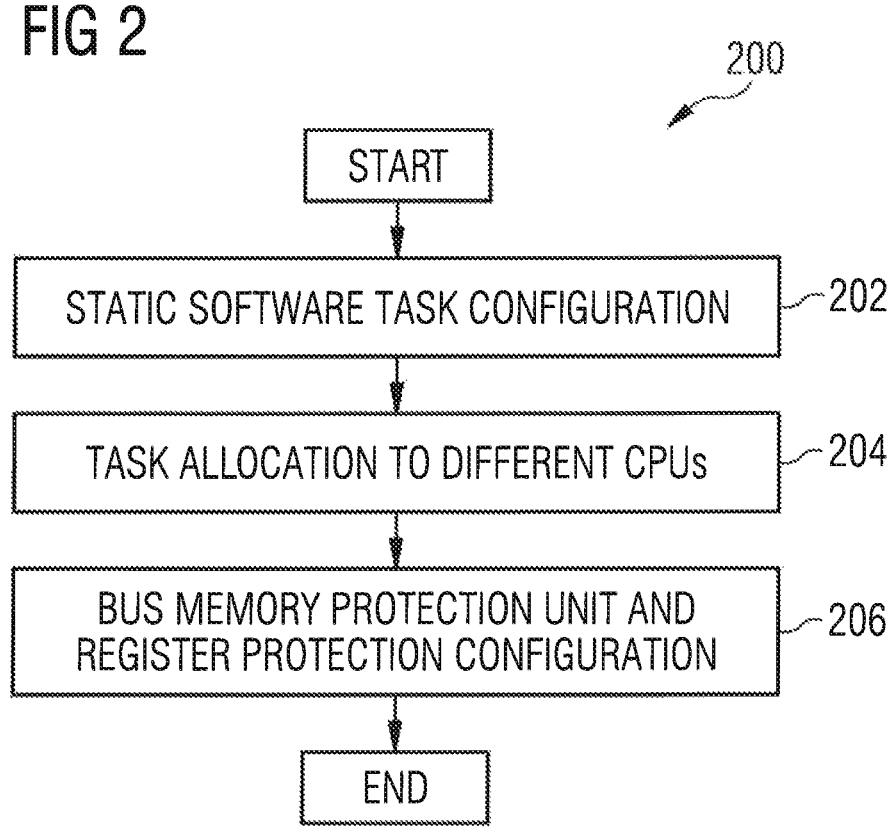

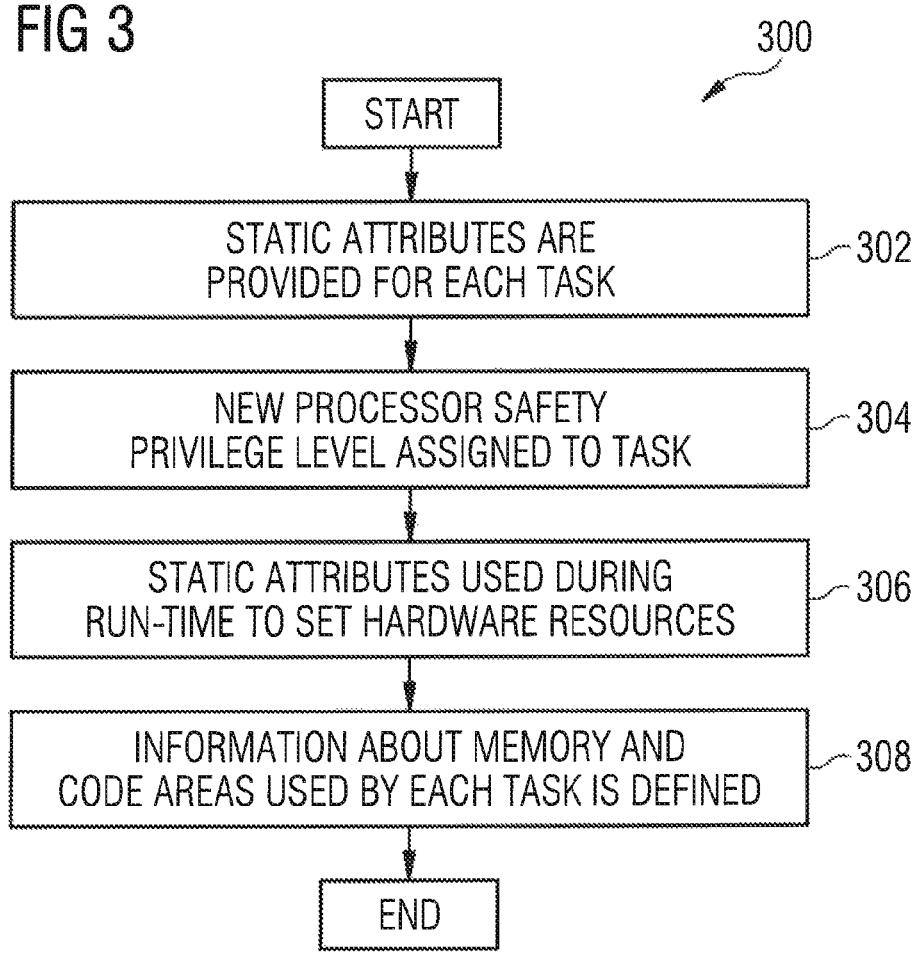
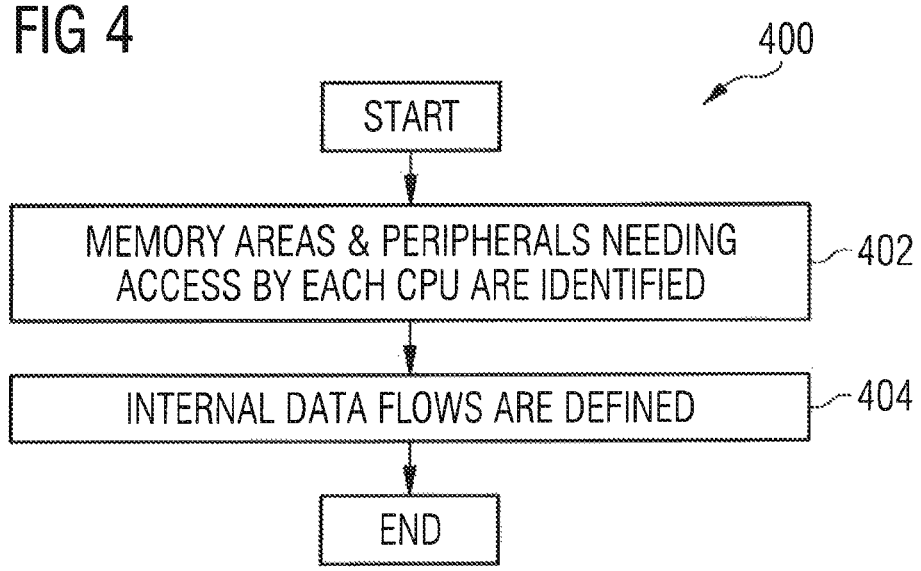

SAFETY HYPERVISOR FUNCTION

REFERENCE TO RELATED APPLICATION

This Application claims priority to U.S. Application No. 61/942,801 filed on Feb. 21, 2014.

FIELD

The disclosure relates to methods and systems for safety functions for microcontrollers. More specifically, the disclosure relates to methods and systems for defining a processor safety privilege level for controlling a distributed memory access protection system.

BACKGROUND

Modern automotive electronic control units (ECUs) continue to integrate an increasing number of functions. This trend is driven by the technology scaling on one side, enabling a high level of integration, and by the highly cost driven nature of the automotive industry that forces reduction in the total number of ECUs per car. Electronics play an increasing role in providing advanced driving assistance functions and especially in preventing hazards that will reduce the number of fatal injuries.

The integration of functions inside an ECU is mainly concentrated around a safe microcontroller that plays a central role by hosting critical acquisition, computation and control functions. The ISO 26262 safety standard provides a way to qualify the criticality of the software involved in a safety application. In a first step through hazard and risk analysis, each function is ranked. This leads to an Automotive Safety Integrity Level (ASIL) for each safety goal. As a consequence, there is a complex set of heterogeneous software components that interact together to provide the intended functionality and integrity.

The privilege levels found in conventional embedded processors are no longer sufficient to fulfill the software encapsulation requirements inherent to the ISO 26262 safety standard. Additionally, the software encapsulation requirements should not be limited to the execution of software inside a CPU but should address all the resources inside a microcontroller. The absence of the proper hardware and software infrastructure to support these software encapsulation requirements requires the construction of significantly complex virtualization layers at the software level which in turn requires an incredibly complex software architecture and consumes a significant portion of the CPU performance. As a result, these deficiencies make it difficult to reach the level of integration expected by the ISO26262 standard and can be a limiting factor in using the possible software integration capabilities of modern CPUs.

Some conventional microcontrollers have tried implementing virtual layers in software so that access to any resource is controlled by a trusted software layer before it is sent to dedicated hardware resources. However, such software is very dependent on the hardware platform and creates a large system bottleneck as the number of software tasks increase.

Therefore, there exists a need for a system and method for a safety hypervisor function that is enabled in both hardware and software. More specifically, there is a need for a new privilege layer that can be specified to any task running in a microcontroller.

SUMMARY

In accordance with one aspect of the disclosure, a system for a safety hypervisor function for accessing a bus in a computer processing system comprises a module for accessing a system memory and a memory unit for storing a safety code. The module allocates the safety code to a processing transaction and the safety code is visible upon access of the bus by the module.

In one embodiment, a system for a safety hypervisor function in a computer system comprises a CPU Memory Protection Unit (CPU MPU) for protecting access to the CPU and local memories, a Bus Memory Protection Unit (Bus MPU) for protecting access to a processor bus, and a Register Memory Protection Unit (Register MPU) for protecting access to one or more peripherals in the system, wherein a safety privilege level is used by the CPU MPU, the Bus MPU and the Register MPU to determine access to the respective devices. In one embodiment, the safety privilege level is located in the Processor Status Word and may be either a safety bit or a safety code. The safety privilege level may also be configured when the system is designed and may be dynamically allocated by the operating system. The safety privilege level restricts access to on-chip transactions.

In accordance with another aspect of the disclosure, a method for performing a safety hypervisor function in a computer system comprises configuring static attributes for a software task, allocating the task to one of the CPUs, and configuring each bus memory protection unit and register protection needed by the task. In one embodiment, the method further comprises assigning a new processor safety privilege level to the task, using the static attributes during run time to set hardware resources, and defining the internal data flow.

Further features, aspects and advantages of the present disclosure will become apparent from the following detailed description of the disclosure made with reference to the accompanying drawings.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure will be readily appreciated as they become better understood by reference to the following detailed description.

FIG. 2 is a flowchart showing a method for performing a safety hypervisor function in accordance with one embodiment of the present disclosure.

FIG. 3 is a flowchart showing a method for performing a safety hypervisor function in accordance with one embodiment of the present disclosure.

FIG. 4 is a flowchart showing a method for performing a safety hypervisor function in accordance with one embodiment of the present disclosure.

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present disclosure. Therefore, the following detailed description is not to be taken in a limiting sense, and the scope of the present disclosure is defined by the appended claims.

Figure 1:
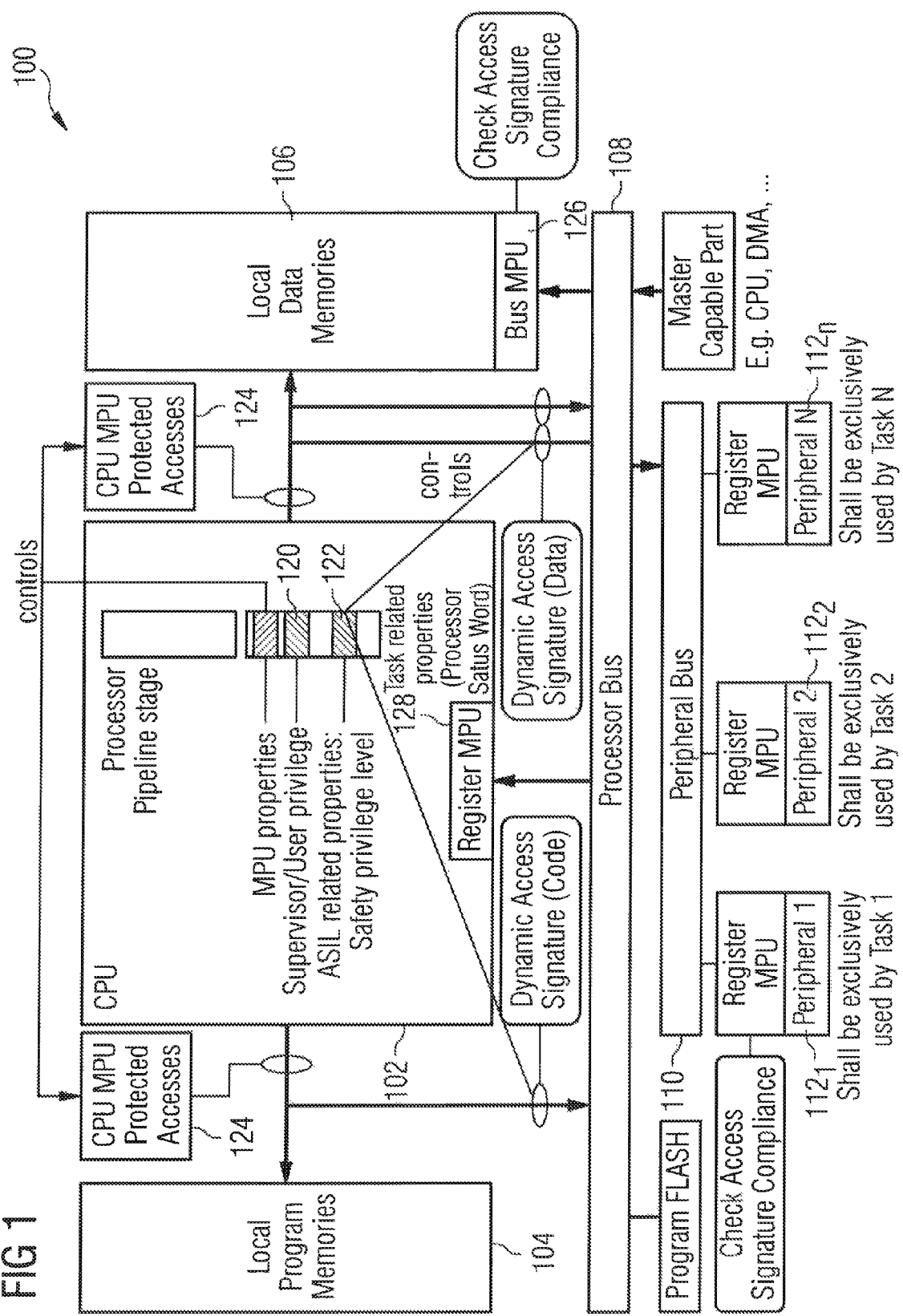
FIG. 1 shows an example schematic diagram of safety hypervisor function in accordance with one embodiment of the present disclosure.

FIG. 1 is an example schematic diagram of a hardware and software enabled safety hypervisor function 100 in accordance with one embodiment of the present disclosure. The present disclosure provides a distributed memory access protection system controlled by a new processor safety privilege level. The safety hypervisor function 100 comprises a CPU 102, local program memories 104, local data memories 106, a processor bus 108, a peripheral bus 110, and a plurality of peripherals $112_1$-$112_n$.

The CPU 102 further comprises a Processor Status Word (PSW) 120. In one embodiment, the PSW 120 contains the static task properties relevant for run-time execution. Typically, information related to a user/supervisor privilege level as well as a memory protection configuration can be found in the PSW. In one embodiment of the present disclosure, the PSW is extended with a new information field 122 that contains a safety privilege level. In one embodiment, the safety privilege level may be a safety bit. In another embodiment, the safety privilege level may be a code that identifies safety properties that are supported by the rest of the CPU architecture.

The present disclosure provides three different types of Memory Protection Units (MPUs): 1) at the CPU level (CPU MPU) 124, 2) at the bus level (Bus MPU) 126, and 3) at the register level (Register MPU) 128. The CPU MPU 124 is directly handled by the CPU to monitor the accesses to the tightly coupled memories, based on the task-level CPU MPU properties in the PSW 120. When a task performs accesses to a bus, an encoding of the safety privilege level (depending on the implementation the native information can be sent) is sent as a new property of the bus transaction. This can be achieved by extending the bus protocol or by adding some side band information with a timing compliant to the bus protocol phase where the information is used.

At the destination, the Bus MPU 126 or Register MPU 128 checks for the compliance of the safety privilege level encoding to its private configuration. The private configuration is the special safety code or identifier for accessing the particular device. A possible encoding can be achieved as follows: in a multi-master bus system, every master has a unique static identifier. The safety privilege level could be used to select an alternate identifier. Then at a destination the private configuration of the Bus or Register MPU would consist of the ability to configure one or several master identifiers that will be granted access to the protected resources. At the MPU level, the protection granularity can specify any of read-only, write-only or read/write attributes or a subset depending on the needs of the architecture.

As can be seen in FIG. 1, the safety privilege level is also used when software running on the CPU needs to configure its own registers. In another embodiment, the present disclosure can use the new safety privilege level as a new protection layer to protect its own critical registers, independent of the supervisor mode.

In another embodiment, the Register MPU 128 and the Bus MPU 126 are independent from the operating system in order to capture potential systematic failures that may arise during the configuration of the system, which is typically an extremely complex process, or inherent to the operating system software itself. In such situations, the operating system controls the CPU MPU 124 where all the other MPUs are configured independently of the operating system. An operating system malfunction during a CPU MPU reconfiguration could enable standard quality software to silently corrupt safety-related resources. For instance, because of some unspecified inputs a QM software could malfunction and arbitrarily try to access a safety-related memory area. In this case, the independent Bus MPU configuration would detect that the task does not propagate the intended safety privilege level and would deny access. Thus, the combination of the safety privilege level and its handling by the hardware units enable the present system to advantageously build an on-chip hypervisor that fulfills the new demands in terms of freedom of interference at the software and hardware levels.

FIG. 2 is a flowchart showing a method 200 for performing a safety hypervisor function in a distributed memory access protection system. For clarity, the method 200 for performing a safety hypervisor function is described in the context of the system 100. However, in alternate embodiments, other configurations may be used. Moreover, other embodiments may perform the acts described here in different orders and/or other embodiments may perform additional and/or different acts than those described here. At 202, the static configuration of the software task is performed. This static software task configuration is described in more detail below with respect to FIG. 3. Then, at 204, the tasks are allocated to different CPUs. This allocation is described below in more detail with respect to FIG. 3. Finally, at 206, based on the information from the static configuration and task allocation, each bus memory protection unit (MPU) and each register protection is configured.

FIG. 3 is a flowchart showing a method 300 for a static software task configuration. The static software task configuration is the first act in performing a safety hypervisor function. At 302 static attributes are provided for each task. In one embodiment, the operating system assigns each task these attributes. At 304 a new processor safety privilege level is assigned to each task. During this phase, each task is also given the User/Supervisor attribute in addition to the new processor safety privilege level. At 306, the static attributes are used during run time to set hardware resources. Finally, at 308 all the information about the memory and code areas used by each task are defined.

FIG. 4 is a flowchart showing a method for the CPU allocation for the different tasks. At 402 memory areas and peripherals needing access by each CPU for a particular task are identified. At 404, this information is used to define all internal data flows.

Thus, the safety hypervisor function of the present disclosure advantageously provides a new processor architecture enhancement by means of a new processor safety privilege level to support higher levels of protection to guarantee non-interference between heterogeneous software components with different safety integrity levels. This processor safety privilege level is independent from the traditional task identifier that is typically found in CPU architectures. For example, the Task ID may be used by the operating system where the safety privilege level is not used by the operating system as it enables monitoring of the operating system itself (within a functional scope that is). In other words, the present disclosure also advantageously enables independent monitoring of the operating system memory protection dynamic allocation and therefore ensures the intended freedom of interference at the hardware level as well.

Moreover, the present disclosure advantageously provides a scalable concept that enables a cost effective implementation by the scalability of the safety privilege level where the levels of protection can be configured. For example, the safety privilege level can be specified to differentiate between ASIL or non-ASIL software or between ASIL D and other software. Other implementations of the concept may enable to identify ASIL D, ASIL C, ASIL A and QM software by using more hardware resources.

Although the above description and related figures describe a safety hypervisor system in the context of a CPU, one skilled in the art will appreciate that the present disclosure may also be generalized to other computer system modules that can access a given bus as a master. In other words, a general system for a safety hypervisor function for accessing a bus in a computer system comprises a module for accessing a system memory and a memory unit for storing a safety code; wherein the module allocates the safety code to the processing transaction and wherein the safety code is visible upon access of the bus by the module. Thus, in another embodiment of the present disclosure, the module may comprise a Direct Memory Access (DMA) and a configuration register for storing the safety code for the DMA. In one embodiment, the safety code may be allocated to a DMA channel transaction.

Figure 5:
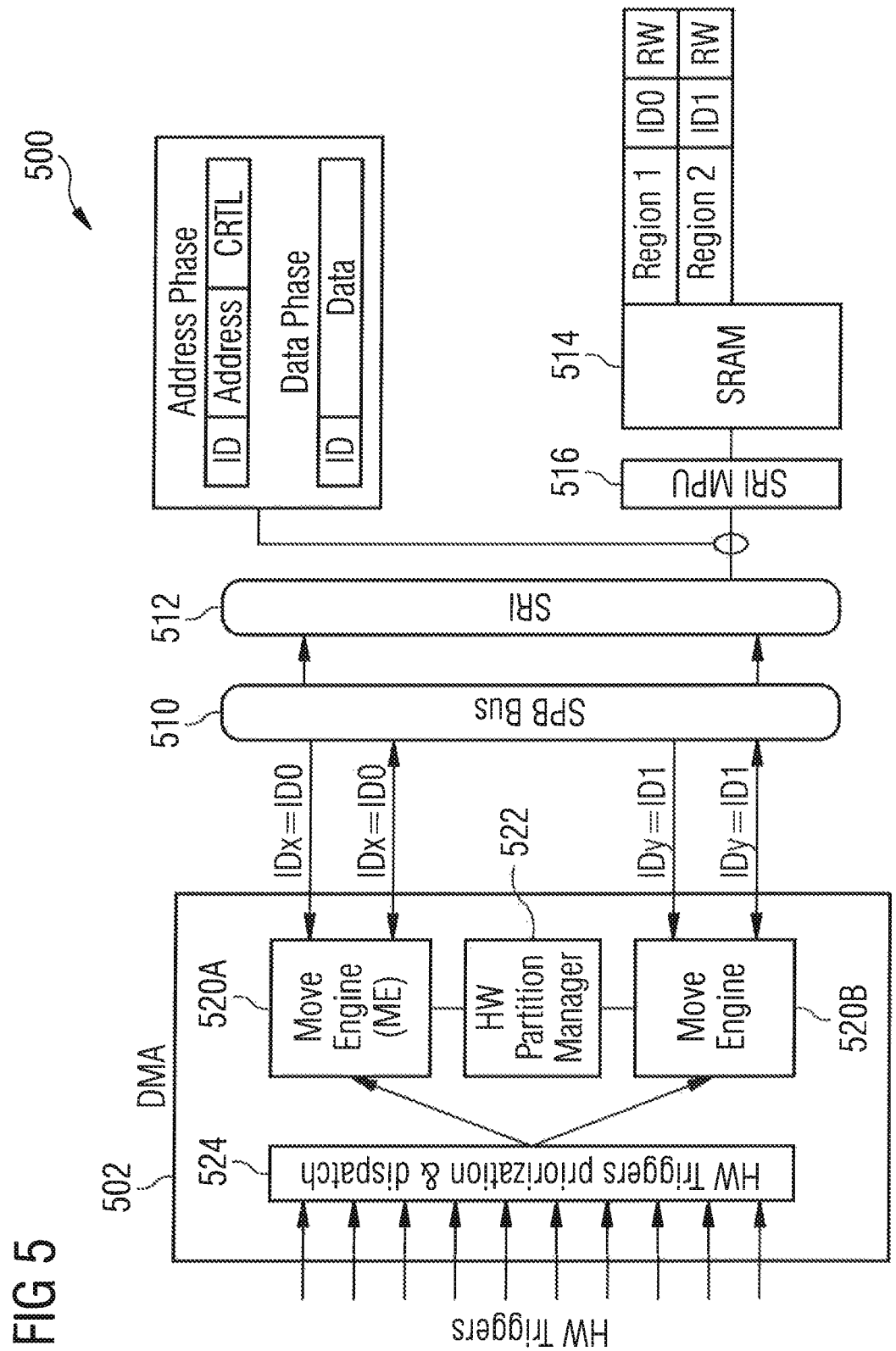
FIG. 5 is an example schematic diagram of another embodiment of a safety hypervisor function for a Direct Memory Access (DMA).

FIG. 5 is an example schematic diagram of another embodiment of the present disclosure 500 comprising a Direct Memory Access (DMA) and a configuration register for storing the safety code for the DMA. The DMA safety hypervisor function 500 comprises a DMA 502, a SPB Bus 510, an SRI 512, an SRAM 514, and an SRI MPU 516. The DMA 502 further comprises at least one Move Engine (ME) 520, an HW Partition Manager 522, and a HW Triggers Prioritization & Dispatch Module 524. A ME 520 is dynamically allocated (according to priority parameters, etc.) to process a given DMA channel that is associated with a given HW trigger. The HW Partition Manager 522 enables and controls which ID is going to be used by a DMA Move Engine 520 for a given DMA channel during a bus transaction. A transaction in SPB 510 and SRI 512 is identified by an ID, and each Move Engine 520 has a unique ID. The SRI Memory Protection Unit (MPU) is configured so that only given DMA channels can write to SRAM Region 0 and only other given DMA channels can write to SRAM Region 1. Other masters or software can only read from Region 1 and Region 2.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A system for a safety hypervisor function for accessing a bus in a computer processing system, the system comprising:
   a processor module for accessing a system memory coupled to the bus, wherein the processor module comprises a processor pipeline stage and a processor status word (PSW), wherein the PSW includes a safety privilege level, wherein the processor module is configured to perform a processing transaction and send the safety privilege level to the bus, where the safety privilege level is associated with the processing transaction; and
   a bus memory protection unit (MPU) coupled to the bus and configured to check compliance of the safety privilege level with an intended safety privilege level, wherein the intended safety privilege level is hardware based and independent of the safety privilege level of the PSW and grant access to a resource based on a comparison of the safety privilege level with the intended safety privilege level.

2. The system of claim 1, wherein the safety privilege level is a safety code and identifies safety properties supported by the processor module.

3. The system of claim 2, wherein the processor module is configured to allocate the safety code for the processing transaction and provide the safety code to the bus.

4. The system of claim 2, further comprising a configuration register for storing the safety code for a direct memory access (DMA).

5. The system of claim 4, wherein the processing transaction is a DMA transaction.

6. The system of claim 1, wherein the bus MPU is configured to configure an identifier for accessing a particular device based on the comparison of the safety privilege level with the intended safety privilege level, wherein the identifier sets access attributes to the resource.

7. The system of claim 1, further comprising a register MPU configured to check compliance of the safety privilege level with its private configuration, wherein the private configuration includes a device based identifier and the register MPU is configured to grant access to register resources based on the checked compliance.

8. The system of claim 1, wherein the bus MPU is configured to grant associated resources as one of read-only, write-only and read/write.

9. The system of claim 8, wherein the associated resources include local program memories and local data memories.

10. The system of claim 1, wherein the processor module is configured to assign a task identification for the processing transaction and provide the task identification to the bus.

11. The system of claim 1, wherein the safety privilege level for the processing denies access to a first memory region and allows access to a second memory region.

12. The system of claim 11, wherein the processor module is configured to perform a second processing transaction and associate a second safety privilege level with the second processing transaction, wherein the second safety privilege level allows access to the first memory region and the second memory region.

13. The system of claim 1, wherein the resource is a local data memory.

14. The system of claim 1, further comprising a register MPU and configured to check compliance of the safety privilege level with a register safety privilege level and provide access to a peripheral based on the compliance.

* * * * *